United States Patent [19]
Platt

[11] 3,941,530
[45] Mar. 2, 1976

[54] CONVERSION OF NONWOVEN FABRIC INTO STAPLE FIBERS

[75] Inventor: Louis Platt, Seneca, S.C.
[73] Assignee: Phillips Petroleum Company, Bartlesville, Okla.
[22] Filed: May 31, 1974
[21] Appl. No.: 475,203

[52] U.S. Cl. .................. 425/83; 19/83; 19/96; 28/4 R
[51] Int. Cl.² .................................. B29D 7/00
[58] Field of Search .......... 19/82, 83, 96, 163, 105, 19/89, 161 R, 155; 156/62.2, 62.4; 28/4 R; 425/83

[56] References Cited
UNITED STATES PATENTS

| | | | |
|---|---|---|---|
| 8,634 | 1/1852 | Kellog | 19/96 |
| 1,425,920 | 8/1922 | Osten | 19/83 |
| 2,824,610 | 2/1968 | Schubert et al. | 19/161 R |

FOREIGN PATENTS OR APPLICATIONS

| | | | |
|---|---|---|---|
| 647,779 | 8/1964 | Belgium | 19/83 |
| 995,281 | 6/1965 | United Kingdom | 19/83 |
| 1,113,025 | 5/1968 | United Kingdom | 19/89 |

*Primary Examiner*—Dorsey Newton

[57] ABSTRACT

Nonwoven fabric is fed at a first rate into the bite between a first shredding element and a stationary working surface. The first shredding element has a plurality of projections which penetrate the fabric and at least substantially shred the fabric as the first shredding element is moved past the working surface at a second rate substantially greater than said first rate. The at least substantially shredded fabric then passes between the first shredding element and a second shredding element, the latter being driven at a third rate substantially different from said second rate to effect additional shredding and to separate the resulting staple fibers. A forced draft fan pulls air past the fabric as the fabric is being worked, to maintain the fabric temperature below the fusion temperature of the fibers.

14 Claims, 6 Drawing Figures

CONVERSION OF NONWOVEN FABRIC INTO STAPLE FIBERS

This invention relates to method and apparatus for converting nonwoven fabric into staple fiber.

Nonwoven or bonded fabrics have been widely accepted for numerous applications because of the simplicity in manufacturing and the low cost. However, one of the problems encountered in maintaining the low cost has been the difficulty of finding uses for the scraps of nonwoven fabric, such as the selvages formed in timing the initially formed nonwoven fabric. If an adhesive is used to bond the fibers together, the adhesive can be removed from the nonwoven fabric through the utilization of a material which is a solvent for the adhesive but not for the fibers. However, the use of solvent is an expensive operation. When a thermoplastic bond is employed in the production of the fabric, solvents cannot be employed and the only solution has been to cut or shred the fabric. However, the shredding equipment employed for such purposes generates a substantial amount of heat, frequently resulting in fusion of fibers.

Accordingly, it is an object of the invention to provide a new and improved method and apparatus for converting nonwoven fabric into staple fibers. It is an object of the invention to effectively shred a nonwoven fabric without causing a significant degree of fusion of the fibers. Another object of the invention is to provide a high quality staple fiber product from nonwoven fabric scraps. Other objects, aspects and advantages of the invention will be apparent from a study of the specification, the drawings and the appended claims to the invention.

Figure 1:
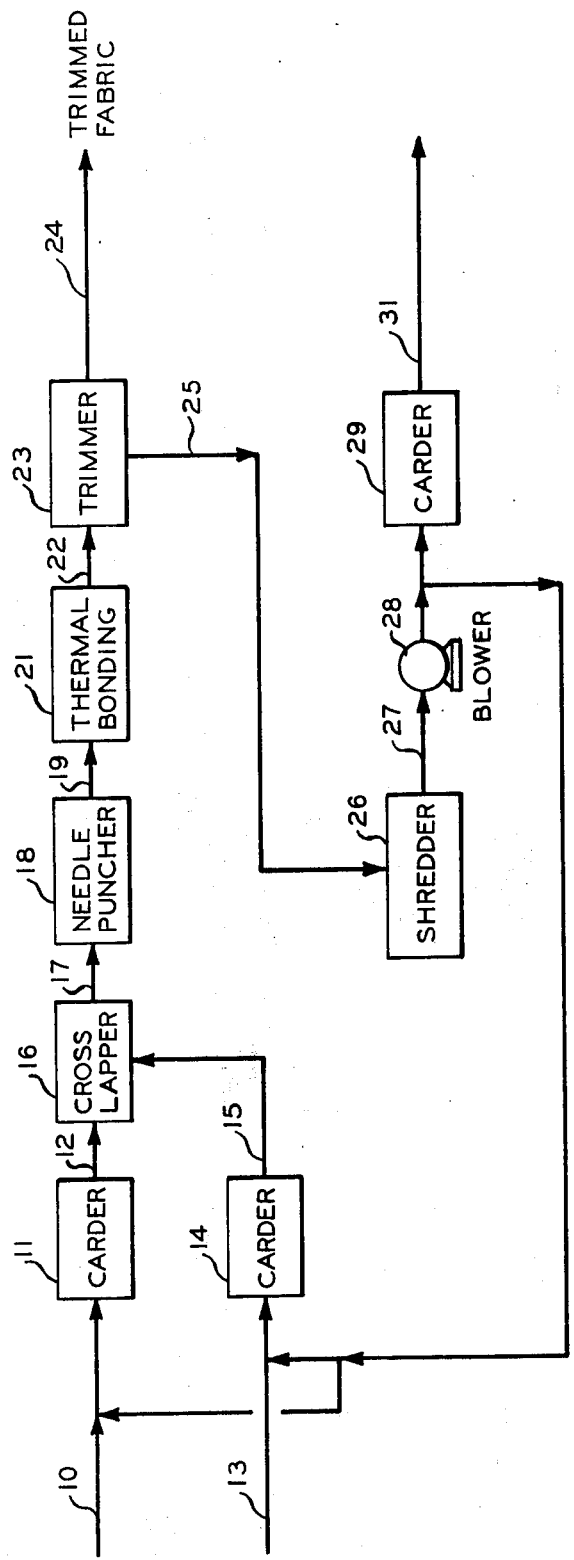
FIG. 1 is a diagrammatic representation of a system for making a nonwoven fabric which incorporates the present invention.
Figure 2:
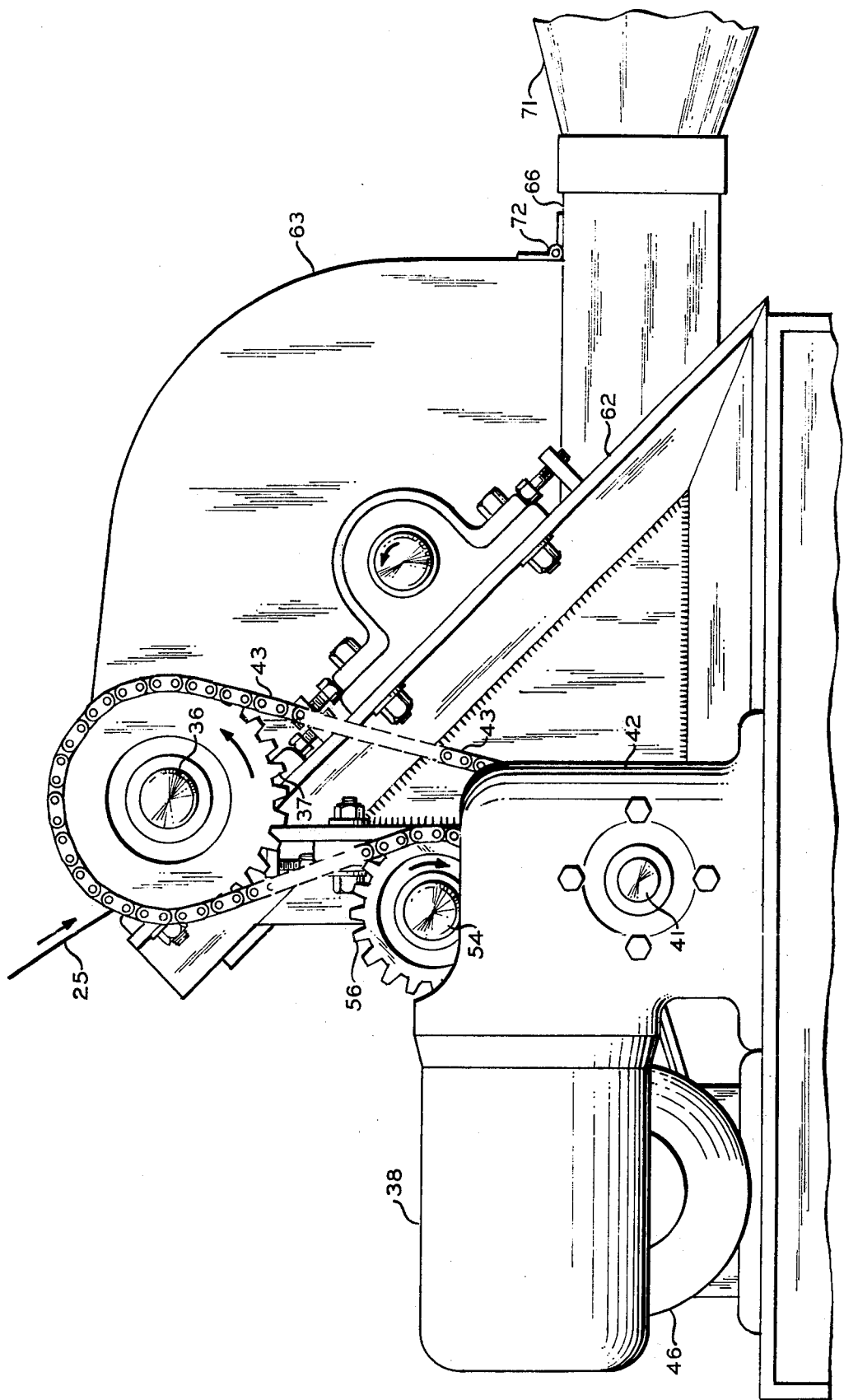
FIG. 2 is a front elevational view of a selvage shredder in accordance with the present invention.
Figure 3:
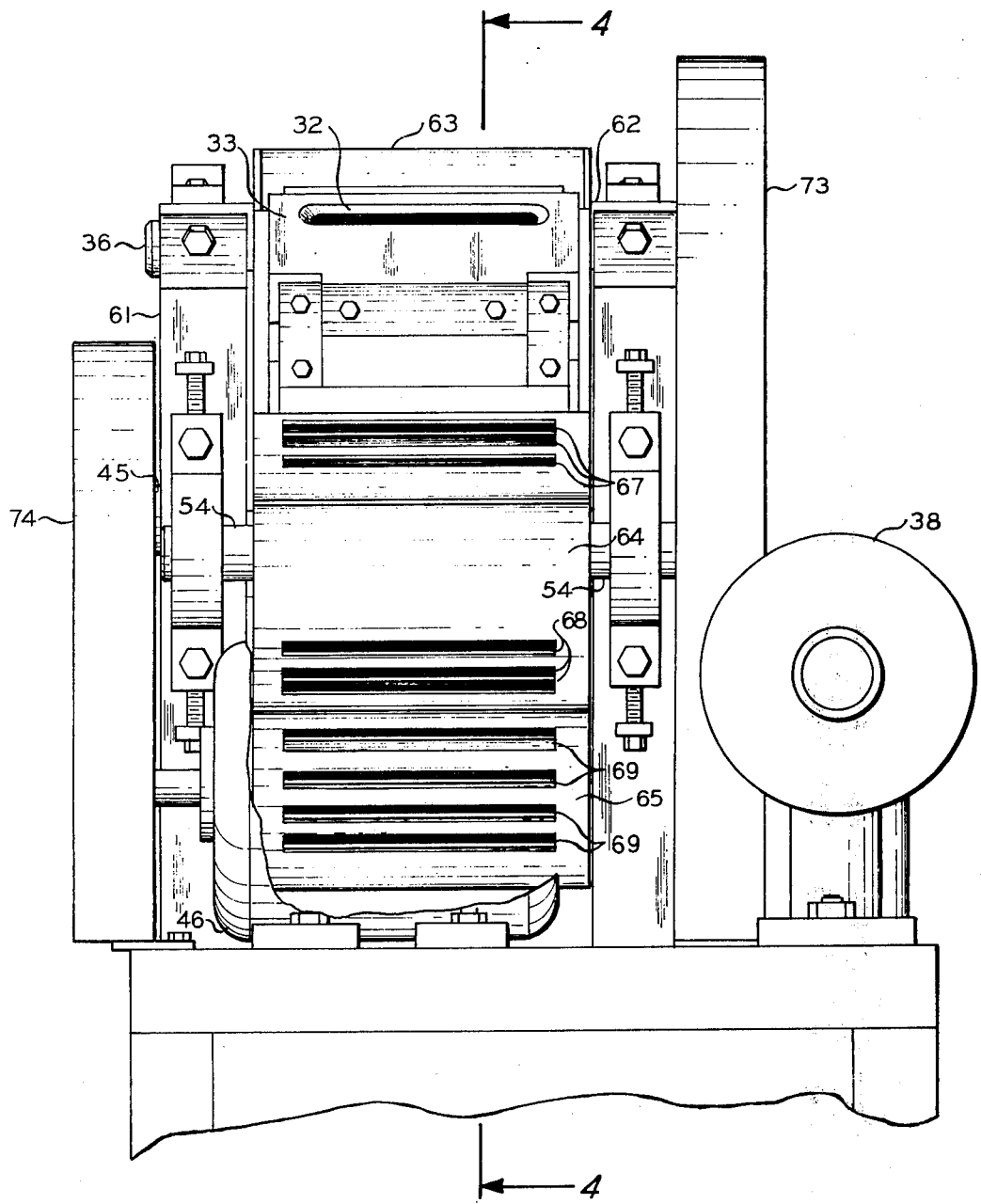
FIG. 3 is a side elevational view of the inlet end of the shredder of FIG. 2, with most of one of the drive motors being omitted.
Figure 4:
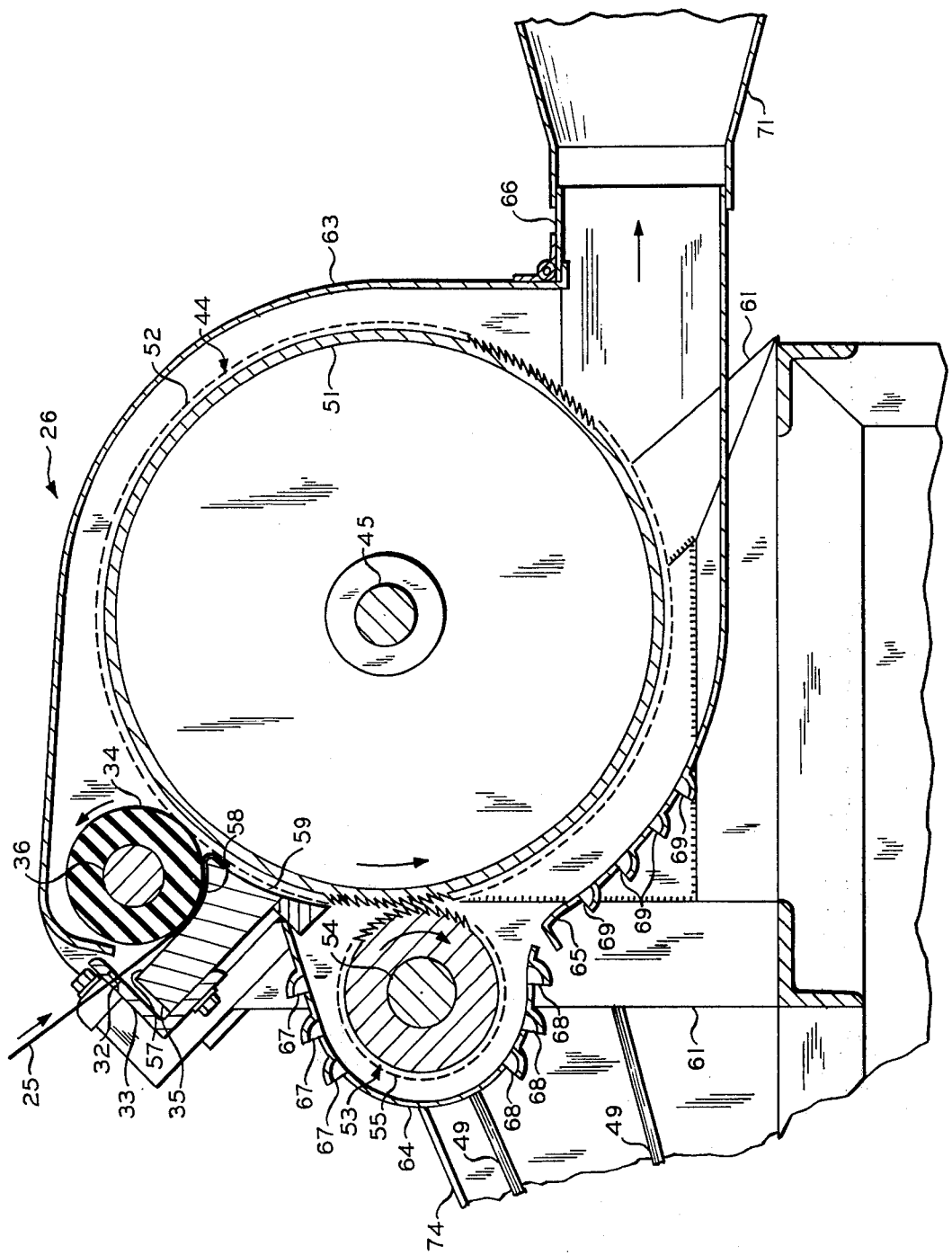
FIG. 4 is a partial vertical cross-sectional view taken along line 4—4 in FIG. 3.
Figure 5:
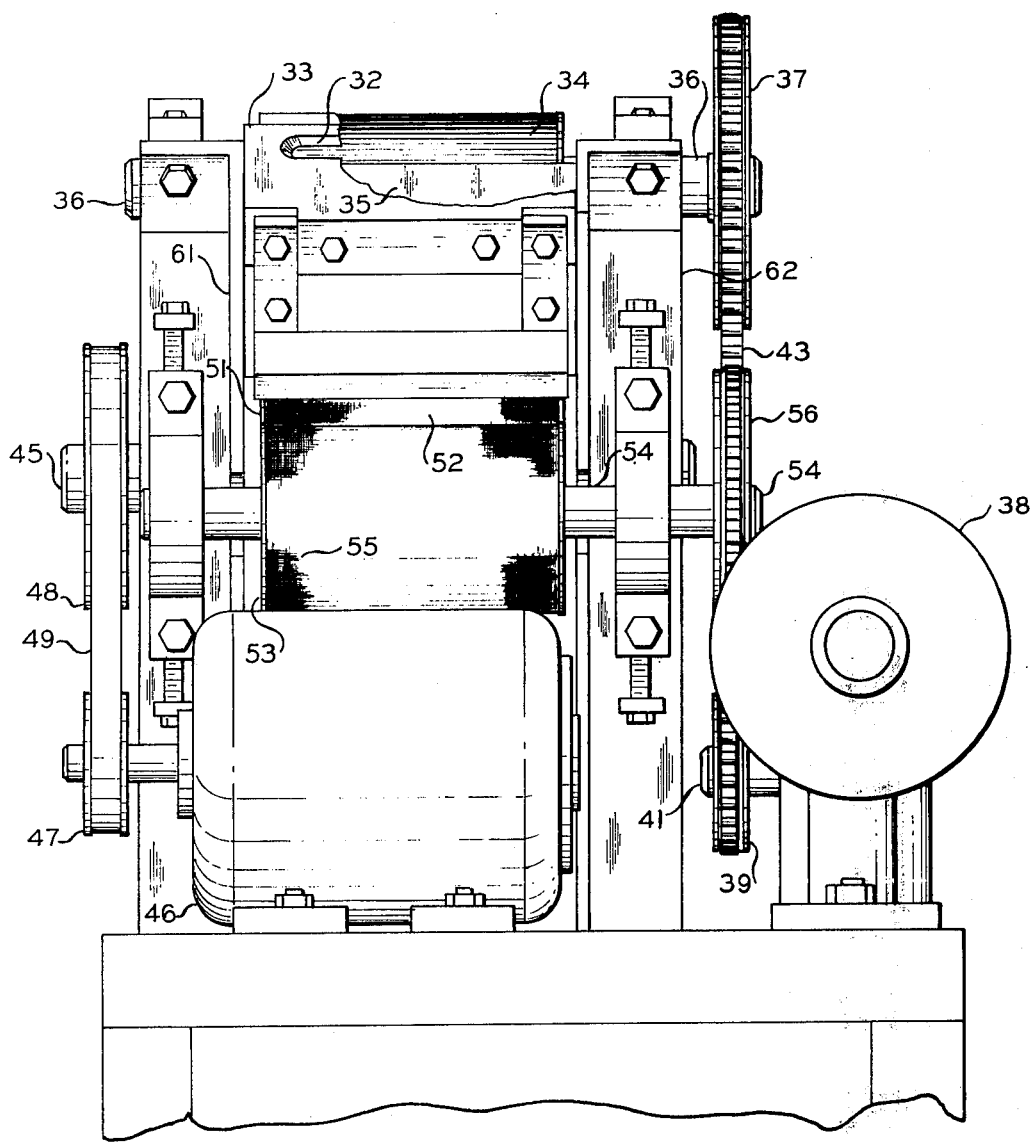
FIG. 5 is a side elevational view of the inlet end of the shredder of FIG. 2 with the covers removed and part of the inlet guide plate broken away.

Referring now to FIG. 1, staple fibers 10 having lengths in the range of ¼ to 9 inches, preferably in the range of ½ to 6 inches, and formed of a suitable fiber-forming thermoplastic material, e.g., a polyolefin such as polypropylene, a polyamide such as nylon 6,6, a polyester such as polyethylene terephthalate, a halogenated vinyl polymer such as polyvinyl chloride, or blends of two or more such fibers, are fed to a carder 11 to form random fibrous structure, or web, 12. Staple fibers 13, having lengths in the range of ¼ to 9 inches, preferably in the range of ½ to 6 inches, and formed of a suitable thermoplastic material which can be the same as or different from fibers 10, are fed to a carder 14 to form a web 15. Webs 12 and 15 are fed to crosslapper 16, wherein one of the webs is crosslapped over the other web to form a multiple layer batting 17. The batting 17 is passed through needle puncher 18 to increase the coherency of the batting. The needle punched batting 19 is heated on one or both surfaces in thermal bonding station 21 to thermally fuse the fibers on the heated surface or surfaces. The resulting bonded nonwoven fabric is passed through trimmer 23 wherein the edges are cut off to produce a trimmed fabric 24 having the desired width. The resulting selvages 25 are passed to shredder 26 which cuts and breaks the nonwoven selvages into staple fibers 27. The staple fibers are withdrawn from shredder 26 by blower 28 and passed to the inlet of carder 29 to form a batting 31 of staple fibers and/or passed to the inlet of carder 11 and/or carder 14 as part of the fibers used to form webs 12 and/or 15. While this process has been described in terms of the preparation of a thermally bonded nonwoven fabric of thermoplastic staple fibers, the invention is also applicable to the preparation of nonwoven fabrics which employ an adhesive, a chemical binder, or a thermoplastic binder which is applied to the fibers to bond the fibers. The invention is also applicable to the production of staple fibers from the selvages of nonwoven fabric formed from continuous filaments or a blend of continuous filaments and staple fibers.

Figure 6:
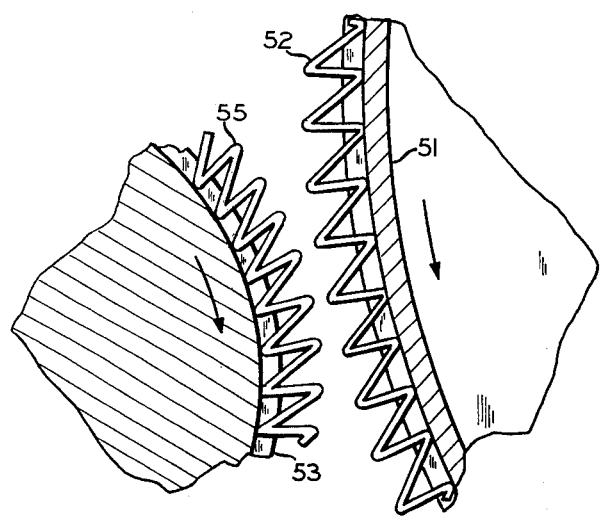
FIG. 6 is an enlarged fragmentary cross-sectional view of the first shredding element, taken along line 4—4 in FIG. 3.

Referring now to FIGS. 2 to 5, the two selvage strips 25 resulting from the trimming of opposite sides of fabric 22 in trimmer 23 are simultaneously fed side by side through the opening 32 in guide 33 and passed between feed roll 34 and feed plate 35. Feed roll 34 is mounted on shaft 36 along with sprocket 37. Motor 38 drives sprocket 39 mounted on shaft 41 through gear reduction box 42. Chain 43 engages sprockets 37 and 39, so that shaft 36 and feed roll 34 are driven by motor 38. The selvage strips 25 are gripped between feed roll 34 and feed plate 35 and then passed into contact with Garnett wire covered beater roll 44. Roll 44 is mounted on shaft 45 and is driven by motor 46 by means of pulleys 47 and 48 and belt 49. As shown in FIG. 6, roll 44 is a hollow cylinder 51 having spiral grooves in the outer cylindrical surface into which is fitted at least one wire 52 having a repetitive sawtooth configuration with alternative points projecting outwardly. In general the density of projecting teeth on roll 44 will be in the range of about 20 to about 200 per square inch, preferably in the range of about 40 to about 100 per square inch. These teeth extend outwardly from roll 44 at a distance of at least equal to preferably at least twice, and more preferably at least four times, the thickness of selvage strip 25. A smaller worker roll 53 is mounted on shaft 54 and is similarly provided with at least one wire 55 having a repetitive sawtooth configuration spirally wound on the cylindrical surfaces of roll 53. In general the density of projecting teeth on roll 53 will be in the range of about 20 to about 200 per square inch, preferably in the range of about 40 to about 100 per square inch. The teeth on roll 53 extend outwardly for a distance of at least equal to, preferably at least twice, more preferably at least four times, the thickness of selvage 25. Shafts 45 and 54 are parallel to each other and are positioned so that the outer teeth points of wire 55 just clear each other. Shaft 36 is also parallel to shaft 45, and is preferably positioned so that roll 34 just clears the outer teeth points of wire 52 on roll 44.

Sprocket 56 is mounted on shaft 54 and engages chain 43 so shaft 54 and roll 53 rotate in the opposite direction to that of roll 44, while feed roll 34 rotates in the same direction as roll 44. Thus, the adjacent surfaces of rolls 34 and 44 move in opposite directions while the adjacent surfaces of rolls 44 and 53 move in the same direction. Feed plate 35 is provided with an inlet section 57 which faces and converges with feed roll 34. The intermediate section 58 of feed plate 35 has a curvature substantially corresponding to the curvature of roll 34 and is positioned closely adjacent roll 34 in a mating relationship to provide an enlarged area wherein the selvage strips 25 are gripped between roll 34 and feed plate 35. The outlet section 59 of feed plate 35 has a working surface with a curvature substantially equal to the curvature of the cylindrical surface formed by the outer teeth points of wire 52 and is positioned adjacent roll 44 so that the clearance between the outer teeth points of wire 52 and the mating working surface of outlet section 59 gradually decreases from a first value at the inlet end to a second value at the outlet end of the working surface of outlet section 59 with the second value being in the range of about 10 to about 80 percent of the thickness of selvage strip 25, preferably in the range of about 20 to about 60 percent, and more preferably in the range of about 25 to about 50 percent of the thickness of an individual selvage strip 25. The feed plate 35 extends into the bit between feed roll 34 and beater roll 44 so that the strips 25 make a sharp turn at the junction of sections 58 and 59. The angle of the junction of sections 58 and 59 will generally be less than 90° and preferably will be less than 80°. The teeth in wire 52 on roll 44 are inclined in the direction of rotation of roll 44, while the teeth in wire 55 on roll 53 are inclined in the direction opposite to the direction of rotation of roll 53. The angle of inclination of the outer teeth in wire 52 to a radius of roll 44 through the base of the leading side of the respective tooth will generally be in the range of 0° to about 10°, will preferably be in the range of about 1° to about 9°, more preferably in the range of about 3° to about 8°. Similarly, the angle of inclination of the outer teeth in wire 55 on roll 53 to a radius of roll 53 through the base of the leading side of the respective tooth will generally be in the range of about 0° to about 20°, preferably in the range of about 1° to about 15°, and more preferably in the range of about 5° to about 12°.

Beater roll 44 is driven with a peripheral speed substantially in excess of the peripheral speed of feed roll 34. The ratio of the peripheral speed of beater roll 44 to the peripheral speed of feed roll 34 generally will be in the range of about 20:1 to about 1000:1, preferably will be in the range of about 25:1 to about 500:1, and more preferably will be in the range of about 30:1 to about 200:1. The decreasing clearance between roll 44 and outlet section 59 of feed plate 35 progressively forces the teeth in wire 52 on roll 44 into the nonwoven fabric selvages 25. The rate of penetrations of selvage 25 by the teeth on roll 44 will generally be in the range of about 500,000 to about 2,000,000, preferably in the range of about 750,000 to about 1,750,000, and more preferably in the range of about 1,000,000 to about 1,600,000, penetrations per linear inch of fabric per minute. With the forward inclination of the teeth in wire 52 and the higher peripheral speed of roll 44, the teeth in wire 52 shred the nonwoven fabric selvages 25 into a batting of individual fibers of varying lengths and small clumps of bonded fibers. This batting is carried into the bite between rolls 44 and 53 where the reversely inclined wire teeth on roll 53 and the slower peripheral speed of roll 53 tends to retard the batting while the forwardly inclined wire teeth on roll 44 and the higher peripheral speed of roll 44 continues the shredding action on the remaining clumps of bonded fibers during the time that the teeth on roll 44 and the teeth on roll 53 simultaneously engage the fibrous material. The ratio of the peripheral speed of beater roll 44 to the peripheral speed of worker roll 53 will generally be in the range of about 20:1 to about 1000:1, preferably in the range of about 25:1 to about 500:1, and more preferably in the range of about 30:1 to about 200:1.

Rolls 34, 44 and 53 are enclosed within a housing formed by the triangular framework members 61 and 62, hood 63, worker roll cover 64, cowling 65, and outlet section 66, such that the primary air inlets are opening 32 in guide plate 33, openings 67 in cover 64 above roll 53, openings 68 in cover 64 below roll 53, and openings 69 in cowling 65. Each of triangular framework members 61 and 62 can be formed of three pieces of angle iron with a plate to close the space between the pieces of angle iron, as shown. A duct 71 connects the outlet section 66 to air blower 28. Air entering openings 67 cools the batting leaving outlet section 59 of feed plate 35 to minimize any fusion of fibers. The air entering openings 68 aids in stripping loose fibers from the bottom side of roll 53, and together with the air entering through openings 69, convey the shredded material through duct 71 to blower 28 and then to one or more of carders 11, 14 and 29. Cover 63 is connected to outlet section 66 by hinge 72 so that cover 63 can be opened to permit access by the operator to rolls 34 and 63. Similarly, cover 64 can be readily removed to permit access to roll 53. Safety covers 73 and 74 can be provided over chain 43 and belt 49, respectively. If desired, a baffle can be placed against cover 63 over roll 44 to aid in removing loose fibers from roll 44. Similarly, a plate can be employed just above the bite of rolls 34 and 44 to force any loose fibers on roll 44 to pass between rolls 34 and 44.

While the shredder 26 has been described in terms of the presently preferred embodiment, which employs projections on rolls 44 and 53 in the form of Garnett wire having a repetitive sawtooth configuration, it is possible to employ other types of projections, such as needles, extending outwardly from the cylindrical surface of the rolls.

Reasonable variations and modifications are possible within the scope of the foregoing disclosure, the drawings and the appended claims to the invention.

That which is claimed is:

1. Apparatus suitable for shredding nonwoven fabric comprising a first shredding element having a large number of projections, each of said projections extending outwardly from a first surface of said element for a distance of at least one fourth of the thickness of the material to be shredded; a plate having a working surface; means for positioning said plate such that said working surface is adjacent said first surface of said first shredding element with the distance between the outer ends of said projections and said working surface gradually decreasing from a first value at the inlet end of said working surface to a second value at the outlet end of said working surface, said second value being less than the thickness of the material to be shredded; feeding means for supplying the material to be shredded to the opening between the inlet end of said working surface and said first surface of said element at a first rate; means for moving said first shredding element past said working surface at a second rate, said second rate being sufficiently greater than said first rate to permit said projections to at least substantially shred said material as said material passes between said first shredding element and said working surface; a second shredding element having projections extending from a first surface thereof; means for positioning said second shredding element such that a part of the first surface of said second shredding element is adjacent to and spaced from a part of the first surface of said first shredding element at a location downstream of said plate to enable projections on said first and second shredding elements to simultaneously engage the at least partially shredded material passing from said outlet end of said working surface; means for moving said second shredding element substantially slower than that of said first shredding element; a housing surrounding said first and second shredding elements and said feeding means and having at least one air inlet opening therein between said feeding means and said second shredding element to direct air on the at least partially shredded material passing from said working surface to said second shredding element; and at least one air inlet therein below said second shredding element to direct air on the shredded material passing from between said first and second shredding elements; and fan means for withdrawing air and the thus shredded material from said housing.

2. Apparatus in accordance with claim 1 wherein said plate has a feeding surface upstream of said working surface; and wherein said feeding means comprises a feed roll positioned so as to cooperate with said feeding surface to grip the material to be shredded and means for rotating said feed roll with the rate of movement of the periphery of said feed roll being said first rate.

3. Apparatus in accordance with claim 2 wherein each of said first surface of said first shredding element, said first surface of said second shredding element and said feed roll has a cylindrical configuration, with the elongated axes thereof being parallel to each other, wherein said feed roll is positioned in close proximity to said first shredding element, wherein said feeding surface and said working surface have substantially arcuate configurations which are at least substantially mateable with the cylindrical configuration of said feed roll and said first shredding element, respectively, and wherein said feeding surface and said working surface are joined together at an angle of less than 90°.

4. Apparatus in accordance with claim 3 wherein the projections on said first shredding element are in the form of at least one wire bent in a repetitive sawtooth configuration and wrapped about the cylindrical first surface of said first shredding element with alternate teeth extending outwardly therefrom.

5. Apparatus in accordance with claim 4 wherein the outwardly extending teeth are inclined in the direction of rotation of said first shredding element.

6. Apparatus in accordance with claim 5 wherein the projections on said second shredding element are in the form of at least one wire bent in a repetitive sawtooth configuration and wrapped about the cylindrical first surface of said second shredding element with alternate teeth extending outwardly therefrom.

7. Apparatus in accordance with claim 6 wherein the outwardly extending teeth of said second shredding element are inclined in the direction opposite to the direction of rotation of said second shredding element; wherein said feed roll and said first shredding element rotate in the same direction, and said second shredding element rotates in the opposite direction.

8. Apparatus in accordance with claim 7 wherein said first shredding element has from 20 to 200 of said outwardly extending teeth per square inch of said first surface of said first shredding element.

9. Apparatus suitable for shredding nonwoven fabric comprising a first shredding element having a large number of projections, each of said projections extending outwardly from a first surface of said element for a distance of at least one-fourth of the thickness of the material to be shredded; a plate having a working surface; means for positioning said plate such that said working surface is adjacent said first surface of said first shredding element with the distance between the outer ends of said projections and said working surface gradually decreasing from a first value at the inlet end of said working surface to a second value at the outlet end of said working surface, said second value being less than the thickness of the material to be shredded; feeding means for supplying the material to be shredded to the opening between the inlet end of said working surface and said first surface of said element at a first rate; means for moving said first shredding element past said working surface at a second rate, said second rate being sufficiently greater than said first rate to permit said projections to at least substantially shred said material as said material passes between said first shredding element and said working surface; a second shredding element having projections extending from a first surface thereof; means for positioning said second shredding element such that a part of the first surface of said second shredding element is adjacent to and spaced from a part of the first surface of said first shredding element at a location downstream of said plate to enable projections on said first and second shredding elements to simultaneously engage the at least partially shredded material passing from said outlet end of said working surface; means for moving said second shredding element substantially slower than said first shredding element; said plate having a feeding surface upstream of said working surface; said feeding means comprising a feed roll positioned so as to cooperate with said feeding surface to grip the material to be shredded and means for rotating said feed roll with the rate of movement of the periphery of said feed roll being said first rate; each of said first surface of said first shredding element, said first surface of said second shredding element and said feed roll having a cylindrical configuration, with the elongated axes thereof being parallel to each other; said feed roll being positioned in close proximity to said first shredding element; said feeding surface and said working surface having substantially arcuate configurations which are at least substantially mateable with the cylindrical configuration of said feed roll and said first shredding element, respectively; said feeding surface and said working surface being joined together at an angle of less than 90°; the projections on said first shredding element being in the form of at least one wire bent in a repetitive sawtooth configuration and wrapped about the cylindrical first surface of said first shredding element with alternate teeth extending outwardly therefrom inclined in the direction of rotation of said first shredding element; the projections on said second shredding element being in the form of at least one wire bent in a repetitive sawtooth configuration and wrapped about the cylindrical first surface of said second shredding element with alternate teeth extending outwardly therefrom inclined in the direction opposite to the direction of rotation of said second shredding element; wherein said feed roll and said first shredding element rotate in the same direction, and said second shredding element rotates in the opposite direction; said first shredding element having from 20 to 200 of said outwardly extending teeth per square inch of said first surface of said first shredding element; a housing surrounding said first and second shredding elements and said feed roll and having at least one air inlet opening therein between said feed roll and said second shredding element to direct air on the at least partially shredded material passing from said working surface to said second shredding element; and at least one air inlet therein below said second shredding element to direct air on the shredded material passing from between said first and second shredding elements; and fan means for withdrawing air and the thus shredded material from said housing.

10. Apparatus comprising means for converting staple fibers into a batting, means for needle punching said batting, means for heating at least one surface of the thus needle punched batting to thermally fuse the fibers in the thus heated surface to thereby form a nonwoven fabric, means for trimming the edges of the thus produced nonwoven fabric to form a trimmed fabric and severed selvages, a first shredding element having a large number of projections, each of said projections extending outwardly from a first surface of said element for a distance of at least one-fourth of the thickness of the material to be shredded; a plate having a working surface; means for positioning said plate such that said working surface is adjacent said first surface of said first shredding element with the distance between the outer ends of said projections and said working surface gradually decreasing from a first value at the inlet end of said working surface to a second value at the outlet end of said working surface, said second value being less than the thickness of the material to be shredded; feeding means for supplying the material to be shredded to the opening between the inlet end of said working surface and said first surface of said element at a first rate; means for forwarding said severed selvages to said feeding means as said material to be shredded; means for moving said first shredding element past said working surface at a second rate, said second rate being sufficiently greater than said first rate to permit said projections to at least substantially shred said material as said material passes between said first shredding element and said working surface; a second shredding element having projections extending from a first surface thereof; means for positioning said second shredding element such that a part of the first surface of said second shredding element is adjacent to and spaced from a part of the first surface of said first shredding element at a location downstream of said plate to enable projections on said first and second shredding elements to simultaneously engage the at least partially shredded material passing from said outlet end of said working surface; means for moving said second shredding element substantially slower than that of said first shredding element; a housing surrounding said first and second shredding elements and said feeding means and having at least one air inlet opening therein between said feeding means and said second shredding element to direct air on the at least partially shredded material passing from said working surface to said second shredding element; and at least one air inlet therein below said second shredding element to direct air on the shredded material passing from between said first and second shredding elements; fan means for withdrawing air and the thus shredded material from said housing; and means for receiving the thus shredded material withdrawn from said housing.

11. Apparatus in accordance with claim 10 further comprising means for passing at least a portion of the shredded material from said means for receiving the thus shredded material withdrawn from said housing to said means for converting staple fibers into a batting as part of the staple fiber feed to said means for converting staple fibers into a batting.

12. A process for shredding nonwoven fabric formed from thermoplastic fibers which comprises passing said fabric at a first rate between a first shredding element and a stationary working surface, said first shredding element having a large number of projections extending outwardly therefrom a distance at least as great as the thickness of the nonwoven fabric to be shredded; moving said first shredding element past said working surface at a second rate substantially higher than said first rate so that said projections penetrate said nonwoven fabric and at least substantially shred the nonwoven fabric into staple fibers, said second rate being such that the penetration of said fabric by the projections of said first shredding element is in the range of about 500,000 to about 2,000,000 penetrations per linear inch of fabric per minute; passing the thus at least substantially shredded fabric between said first shredding element and a second shredding element having a plurality of projections projecting outwardly therefrom; moving said second shredding element at a third rate substantially slower than said second rate such that the projections of the first and second shredding elements are simultaneously engaging said at least substantially shredded fabric but are moving at substantially different rates to thereby further shred the fabric and separate the resulting staple fibers; causing air to pass into contact with the at least substantially shredded fabric leaving said working surface to maintain the temperature of said at least substantially shredded fabric below the fusion temperature of the fibers thereof; causing air to pass into contact with the fibers being separated between said first and second shredding elements; and recovering the thus separated fibers.

13. A process in accordance with claim 12 wherein the linear flow rates of the air pressing into contact with said at least substantially shredded fabric and of the air passing into contact with said fibers being separated are substantially greater than said second and third rates.

14. A process in accordance with claim 12 wherein the ratio of said second rate to said first rate is in the range of about 30:1 to about 200:1, and the ratio of said second rate to said third rate is in the range of about 30:1 to about 200:1; wherein said nonwoven fabric is formed of fibers of synthetic organic thermoplastic polymer thermally bonded together; wherein the distance between the downstream end of said working surface and said projections on said first shredding element is in the range of 25 to 50 percent of the thickness of said nonwoven fabric.

* * * * *